United States Patent [19]

Gebhardt

[11] Patent Number: 5,207,313
[45] Date of Patent: May 4, 1993

[54] KIT FOR REFITTING RETARDING ROLLER

[75] Inventor: Elfriede J. Gebhardt, Sinsheim, Fed. Rep. of Germany

[73] Assignee: Gebhardt Fordertechnik GmbH, Fed. Rep. of Germany

[21] Appl. No.: 830,468

[22] Filed: Feb. 6, 1992

Related U.S. Application Data

[63] Continuation of Ser. No. 517,705, May 2, 1990, abandoned.

[30] Foreign Application Priority Data

May 3, 1989 [DE] Fed. Rep. of Germany ... 8905555[U]

[51] Int. Cl.⁵ .......................................... B65G 13/02
[52] U.S. Cl. .................................... 198/780; 198/790
[58] Field of Search ............... 198/780, 781, 784, 789, 198/790, 785; 193/37, 35 A

[56] References Cited

U.S. PATENT DOCUMENTS

| | | | |
|---|---|---|---|
| 2,346,659 | 4/1944 | Bruce | 198/790 X |
| 2,883,172 | 4/1959 | Mitchell | 198/790 X |
| 2,924,343 | 2/1960 | Isven | 198/789 X |
| 3,181,688 | 5/1965 | Schermer | 198/789 |
| 3,550,741 | 12/1970 | Sherman | 198/780 X |
| 3,587,828 | 6/1971 | Ferko | 198/790 |
| 3,631,967 | 1/1972 | Converse, III et al. | 198/790 X |
| 3,696,912 | 10/1972 | Fleischauer et al. | 193/35 A |
| 3,730,330 | 5/1973 | De Good | 198/781 |
| 3,762,533 | 10/1973 | Giles | 198/780 X |
| 3,810,538 | 5/1974 | Moyes | 198/781 |
| 3,847,260 | 11/1974 | Fowler | 193/37 |
| 3,876,058 | 4/1975 | Gray et al. | 198/780 X |
| 4,013,161 | 3/1977 | Nelson | 198/781 |
| 4,103,769 | 8/1978 | Jorgensen | 198/781 |
| 4,219,114 | 8/1980 | Kovacs | 198/784 X |
| 4,355,715 | 10/1982 | Chorlton | 198/790 X |
| 4,445,257 | 5/1984 | Delhaes | 198/780 X |
| 4,911,284 | 3/1990 | Weihe et al. | 198/780 X |
| 4,926,995 | 5/1990 | Kauffman | 198/780 X |

FOREIGN PATENT DOCUMENTS

| | | | |
|---|---|---|---|
| 2166753 | 6/1975 | Fed. Rep. of Germany | 198/781 |
| 0037312 | 2/1986 | Japan | 198/785 |
| 2192587 | 8/1987 | Japan | 198/785 |
| 1288135 | 2/1987 | U.S.S.R. | 198/785 |
| 1371953 | 2/1988 | U.S.S.R. | 198/785 |

Primary Examiner—D. Glenn Dayoan
Attorney, Agent, or Firm—Staas & Halsey

[57] ABSTRACT

A kit for retrofitting retarding roller conveyors having a plurality of retarding rollers, each having an outer cylindrical surface of a given diameter, the retarding rollers being arranged parallel to each other, transversely between opposite sides of a frame, each retarding roller being rotatable about a rotation axis and spaced apart from each other by a distance measured between the outer cylindrical surfaces of adjacent ones of the retarding rollers, the kit having a plurality of roller elements, two roller elements being fitted on each retarding roller, each roller element having an outer cylindrical surface of a diameter greater than the outer cylindrical surface of the retarding rollers; and a plurality of timing belts, one timing belt extending between and thus interconnecting two adjacent retarding rollers.

5 Claims, 4 Drawing Sheets

KIT FOR REFITTING RETARDING ROLLER

This application is a continuation of application Ser. No. 07/517,705, filed May 2, 1990, now abandoned.

BACKGROUND OF THE INVENTION

1. Field of the Invention

The invention relates to a kit for refitting retarding roller conveyors whose clearance between retarding rollers is greater than the support element of a container to be transported, i.e., so that the distance between two rollers is so great that the support element of the container to be transported hinders its movement.

2. Description of the Related Art

Retarding roller conveyor systems for storage and transport of individual items, without retaining pressure, consist of a frame with cheeks on both sides, with carrier rollers to carry the individual items mounted to rotate transverse to the transport direction arranged between them, where these rollers can be connected in groups and driven by an adjustable intermediate roller with a constantly running pulling element, for example. In this case, the intermediate rollers of each roller group are connected with a sensor controlled by the individual items by way of a setting element, and can be set in a drive position and an idle position using this setting element.

The axes of the rollers which carry the individual items are spaced a certain distance apart. Depending on the goods to be transported, this distance between axes and the roller diameter play a significant role.

In storage technology, containers designated as small load carriers are being increasingly used to hold product parts. These small load carriers are equipped with corresponding retention elements so that they can be stacked without danger. These retention elements are also the support elements during the transport process on the aforementioned retarding roller conveyor systems.

If, however, the distance between the axes of two transport rollers is too great, and the diameter of these rollers is too small, problem-free transport of such small load carriers is no longer guaranteed, since the support elements of the small load carriers come between the transport rollers and become jammed.

SUMMARY OF THE INVENTION

An object of the present invention is therefore to creating a kit which serves to refit existing conveyor systems to meet such conditions.

On the basis of the attached drawings, which show special embodiments of the invention, these will be explained in greater detail.

DETAILED DESCRIPTION OF THE PREFERRED EMBODIMENTS

Figure 1:
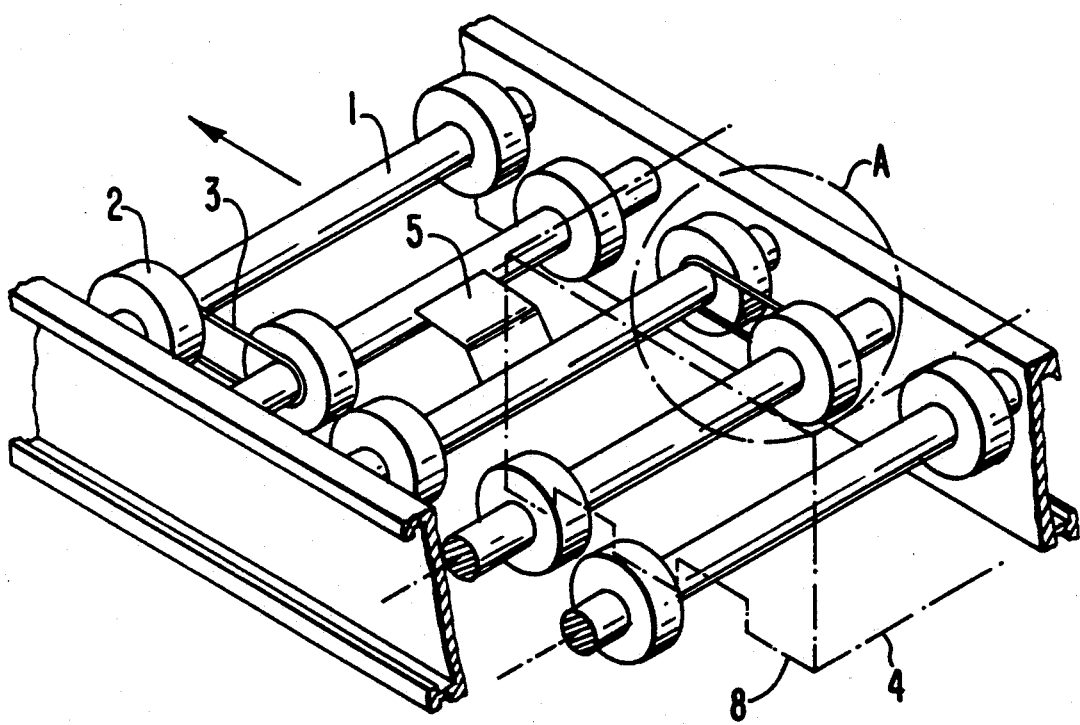
FIG. 1 is a perspective view of a refitted conveyor system.

FIG. 1 shows a perspective view of a refitted conveyor system.

In this embodiment, the roller elements 2 are pushed onto the existing transport rollers 1. The ratio of the inside diameter of the roller element 2 and the outside diameter of the existing transport roller 1 is such that the roller element 2 sits firmly and immovably on the transport roller 1.

A sensor flap 5 projects into the transport path, with an angled portion pointing in the transport direction.

In this case, the sensor flap 5 is connected with a setting device, which is not described in greater detail here and is not shown.

The small load carrier, designated with the reference numeral 4, especially its support element 8, can therefore no longer get between the transport rollers in such a way as to block them.

An overdrive or timing belt 3 connects two adjacent transport rollers with one another, in order to achieve better force distribution of the driven rollers to the loose rollers.

Figure 2:
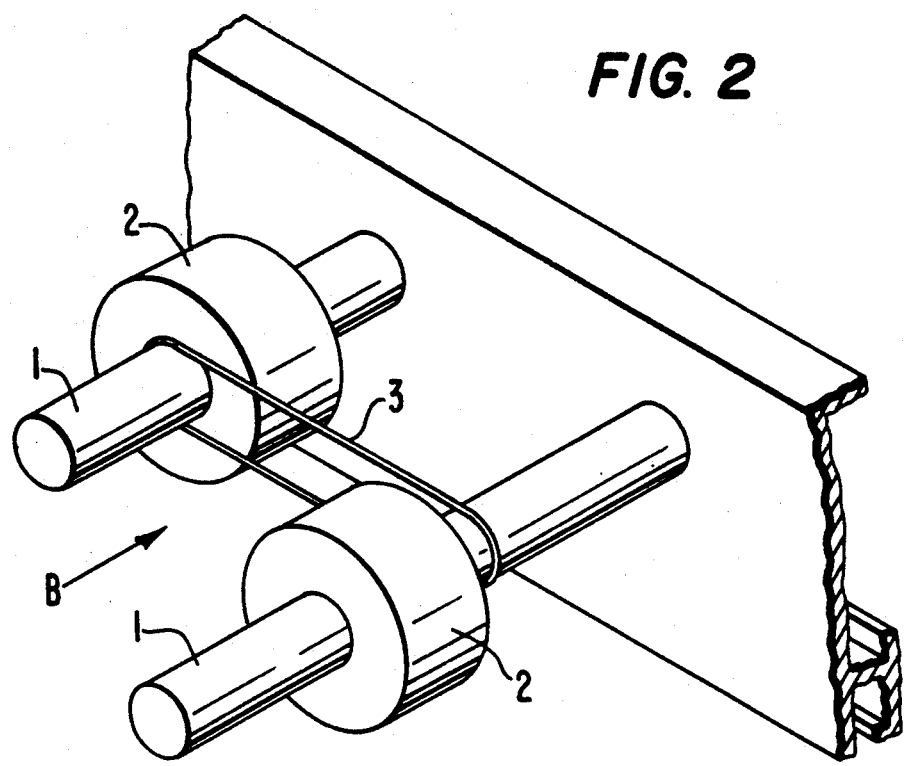
FIG. 2 is an enlargement of Detail A marked in FIG. 1.

FIG. 2 shows the detail marked as broken-line circle "A" FIG. 1 in an enlarged view, with the same elements being designated with the same reference symbols.

Figure 3:
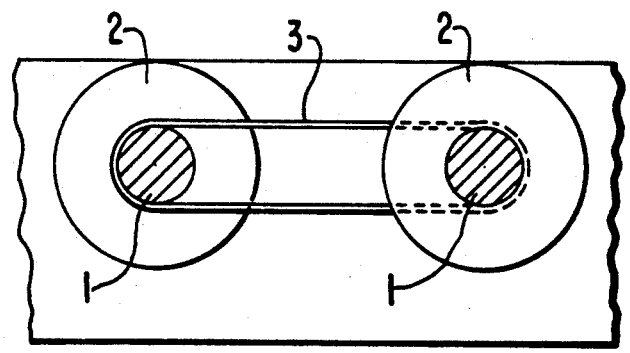
FIG. 3 is a frontal view from the direction marked as B in FIG. 2.
Figure 4:
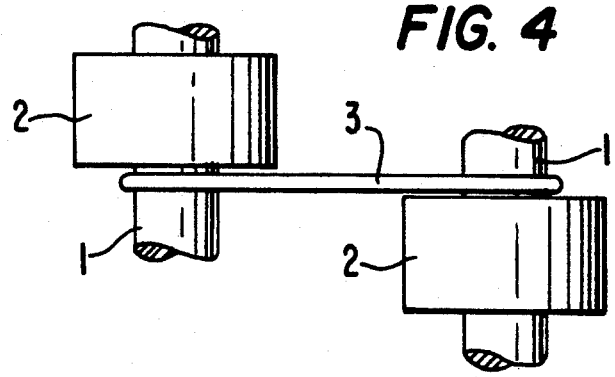
FIG. 4 is a top view of FIG. 3.

FIG. 3 shows a vertical sectional view from the direction marked as B in FIG. 2, and FIG. 4 shows a top view of FIG. 3.

This makes it evident that the roller elements 2 are offset against one another, with a gap between them.

Figure 5:
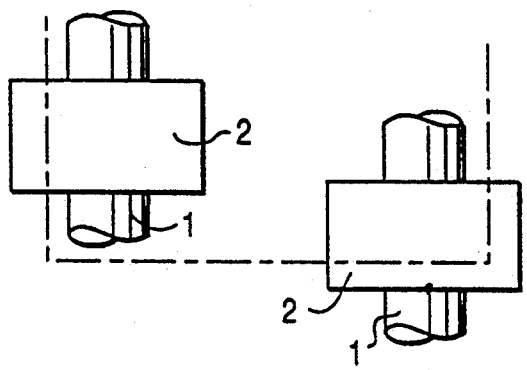
FIG. 5 is a variation of FIG. 4.

FIG. 5 is a top view, showing a variation of the embodiment of FIGS. 1-4, with the roller elements 2 being arranged offset, but overlapping one another.

Figure 6:
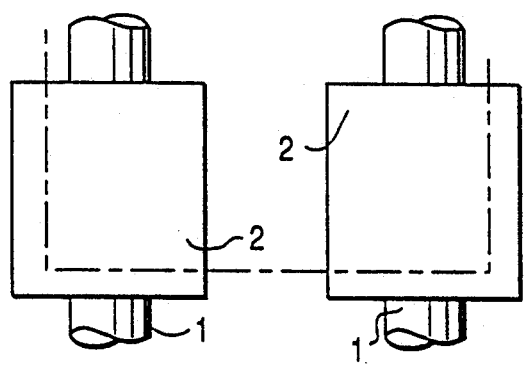
FIG. 6 is a variation of FIG. 4 and 5.

FIG. 6 is a top view of another embodiment, showing two roller elements 2 which take up the same transport width.

Figure 7:
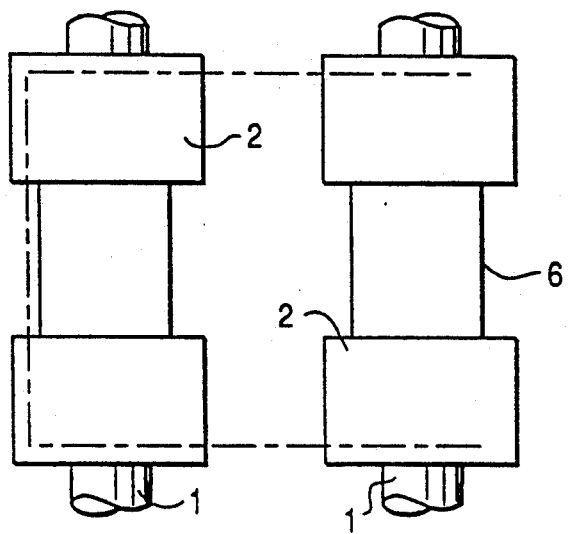
FIG. 7 is a variation of FIG. 4, 5 and 6.

FIG. 7 is a top view as another embodiment, showing the possibility of pushing only one roller element 2 onto a transport roller 1, with the former having a lathed groove 6, in order not to encumber the setting movement of the sensor flap 5.

Figure 8:
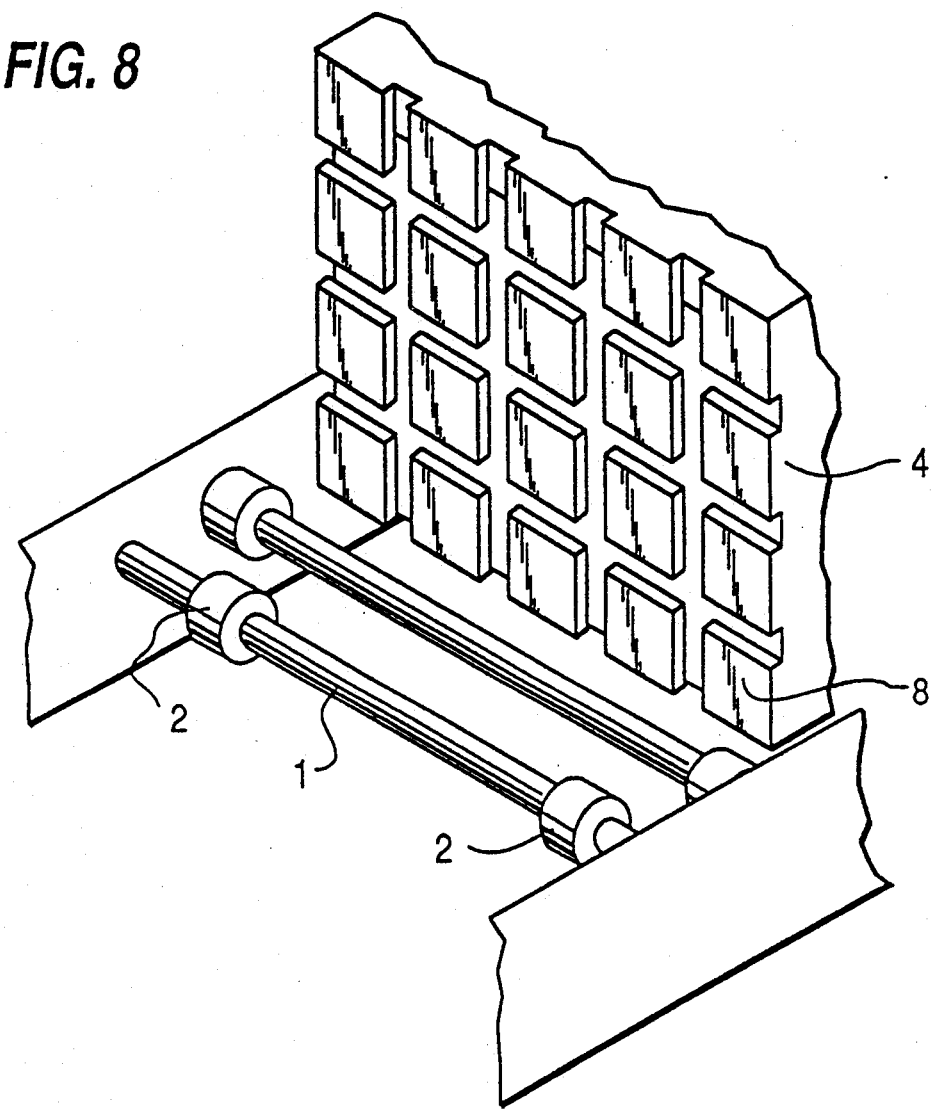
FIG. 8 is the representation of a small load carrier.

FIG. 8 shows a perspective representation of the small load carrier 4, with this being tipped up in order to show the structure of the bottom with its support elements.

Figure 9:
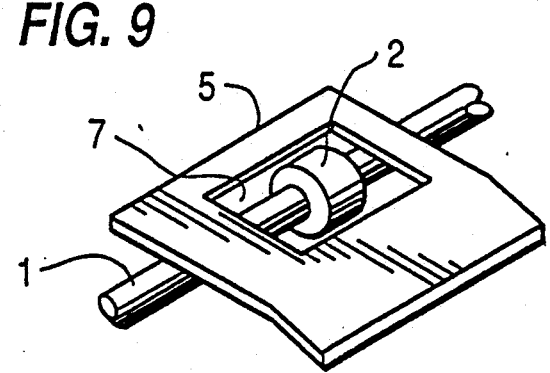
FIG. 9 is a perspective view of a flap according to the present invention.

FIG. 9 shows an embodiment of the sensor flap 5, which can be structured to be a single piece, on the one hand, or have an opening 7 to allow a roller element 2 to project through.

The present invention makes a kit available which can be used to refit existing retarding roller conveyor systems in such a way that any type of conveyed goods can be transported, regardless of the shape of these goods.

I claim:

1. A kit for retrofitting retarding roller conveyors having a plurality of retarding rollers, each having an outer cylindrical surface of a given diameter, the retarding rollers being arranged parallel to each other, transversely between opposite horizontal frame members of a frame, each retarding roller being rotatable about a rotation axis and spaced apart from each other by a distance measured between the outer cylindrical surfaces of adjacent ones of the rotating rollers, the kit comprising:

a plurality of roller support elements, two roller support elements being adapted to be fitted on each retarding roller, each roller support element having an outer cylindrical surface of a diameter greater than the diameter of the outer cylindrical surface of each of the retarding rollers whereby the space between adjacent retarding rollers is decreased so as to prevent articles being conveyed from jamming between adjacent retarding rollers; and a plurality of timing belts adapted to be disposed between the opposite horizontal frame members, each timing belt being further adapted to extend between and thus interconnect a pair of adjacent retarding rollers to form a plurality of independently coupled pairs of retarding rollers.

2. A kit according to claim 1, wherein for each pair of adjacent retarding rollers, the two roller support elements for one retarding roller are offset in non-overlapping relationship from the two roller support elements of the other retarding roller.

3. A kit according to claim 1, wherein for each pair of adjacent retarding rollers, the two roller support elements for one retarding roller are aligned with the two roller support elements of the other retarding roller.

4. A kit according to claim 1, wherein for each pair of adjacent retarding rollers, the two roller support elements for one retarding roller are in overlapping relationship with respect to the two roller support elements of the other retarding roller.

5. A kit for retrofitting retarding roller conveyors having a plurality of retarding rollers, each having an outer cylindrical surface of a given diameter, the retarding rollers being arranged parallel to each other, transversely between opposite sides of a frame, each retarding roller being rotatable about a rotation axis and spaced apart from each other by a distance measured between the outer cylindrical surfaces of adjacent ones of the retarding rollers, the kit comprising:

a plurality of roller support elements, each roller support element being adapted to be fitted on one retarding roller, each roller support element having two diametrically enlarged opposite end portions, each end portion having an outer cylindrical surface of a diameter greater than the diameter of the outer cylindrical surface of each of the retarding rollers, whereby the space between adjacent retarding rollers is decreased so as to prevent articles being conveyed from jamming between adjacent retarding rollers, the two end portions of each roller support element defining a medial potion having an outer cylindrical surface of a diameter less than that of the end portions but greater than that of each of the retarding rollers; and a plurality of timing belts, each timing belt being adapted to extend between and thus interconnect a pair of adjacent retarding rollers to form a plurality of independently coupled pairs of retarding rollers.

* * * * *